US007798299B2

(12) United States Patent
Schultz

(10) Patent No.: US 7,798,299 B2
(45) Date of Patent: Sep. 21, 2010

(54) DUAL INPUT CLUTCH TRANSMISSION WITH TORQUE CONVERTER PUMP DRIVE

(75) Inventor: John C. Schultz, Saline, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 418 days.

(21) Appl. No.: 11/558,064

(22) Filed: Nov. 9, 2006

(65) Prior Publication Data

US 2008/0110714 A1     May 15, 2008

(51) Int. Cl.
    *F16D 33/00*      (2006.01)
(52) U.S. Cl. ........................................ 192/3.27
(58) Field of Classification Search ....... 192/3.25–3.27, 192/70.12, 113.34, 87.11; 74/730.1
See application file for complete search history.

(56) References Cited

U.S. PATENT DOCUMENTS

| | | | | | |
|---|---|---|---|---|---|
| 2,736,407 | A | * | 2/1956 | Smirl | 192/3.33 |
| 3,611,835 | A | * | 10/1971 | Borman | 475/281 |
| 3,749,217 | A | * | 7/1973 | Bush et al. | 192/113.34 |
| 3,766,794 | A | * | 10/1973 | Wilcox | 74/355 |
| 3,799,004 | A | * | 3/1974 | Hause | 475/281 |
| 3,862,581 | A | * | 1/1975 | O'Malley | 475/281 |
| 3,938,631 | A | * | 2/1976 | Smith | 192/3.52 |
| 3,964,585 | A | * | 6/1976 | Murayama et al. | 192/87.13 |
| 3,970,176 | A | * | 7/1976 | Bucksch | 192/87.11 |
| 4,191,072 | A | * | 3/1980 | Ehrlinger et al. | 475/68 |
| 4,793,213 | A | * | 12/1988 | Nishimura | 74/730.1 |
| 6,378,675 | B1 | * | 4/2002 | Kundermann et al. | 192/3.27 |
| 6,460,669 | B2 | * | 10/2002 | Inoue et al. | 192/3.21 |
| 7,669,497 | B2 | * | 3/2010 | Borgerson et al. | 74/340 |

\* cited by examiner

*Primary Examiner*—Rodney H Bonck
*Assistant Examiner*—Justin Holmes
(74) *Attorney, Agent, or Firm*—Quinn Law Group, PLLC

(57) ABSTRACT

A dual-input clutch transmission is provided having a torque converter with a rotatable hub, the transmission comprising a transmission pump having internal fluid channels and a rotor set which is drivingly connected to the hub, and a dual-input clutch in fluid communication with the transmission pump through the fluid channels. The pump and torque converter are positioned along a common axis of rotation, the pump circumscribing the torque converter hub to reduce axial space. The dual-input clutch is mounted to the transmission pump housing for structural support. A method is also provided for reducing axial space within a dual-input clutch transmission having a torque converter, including providing an on-axis transmission pump with a housing and rotor set, providing a torque converter with a rotatable hub which is drivingly connected to the rotor set for powering of the transmission pump, and mounting the dual-input clutch to the pump housing for support.

11 Claims, 2 Drawing Sheets

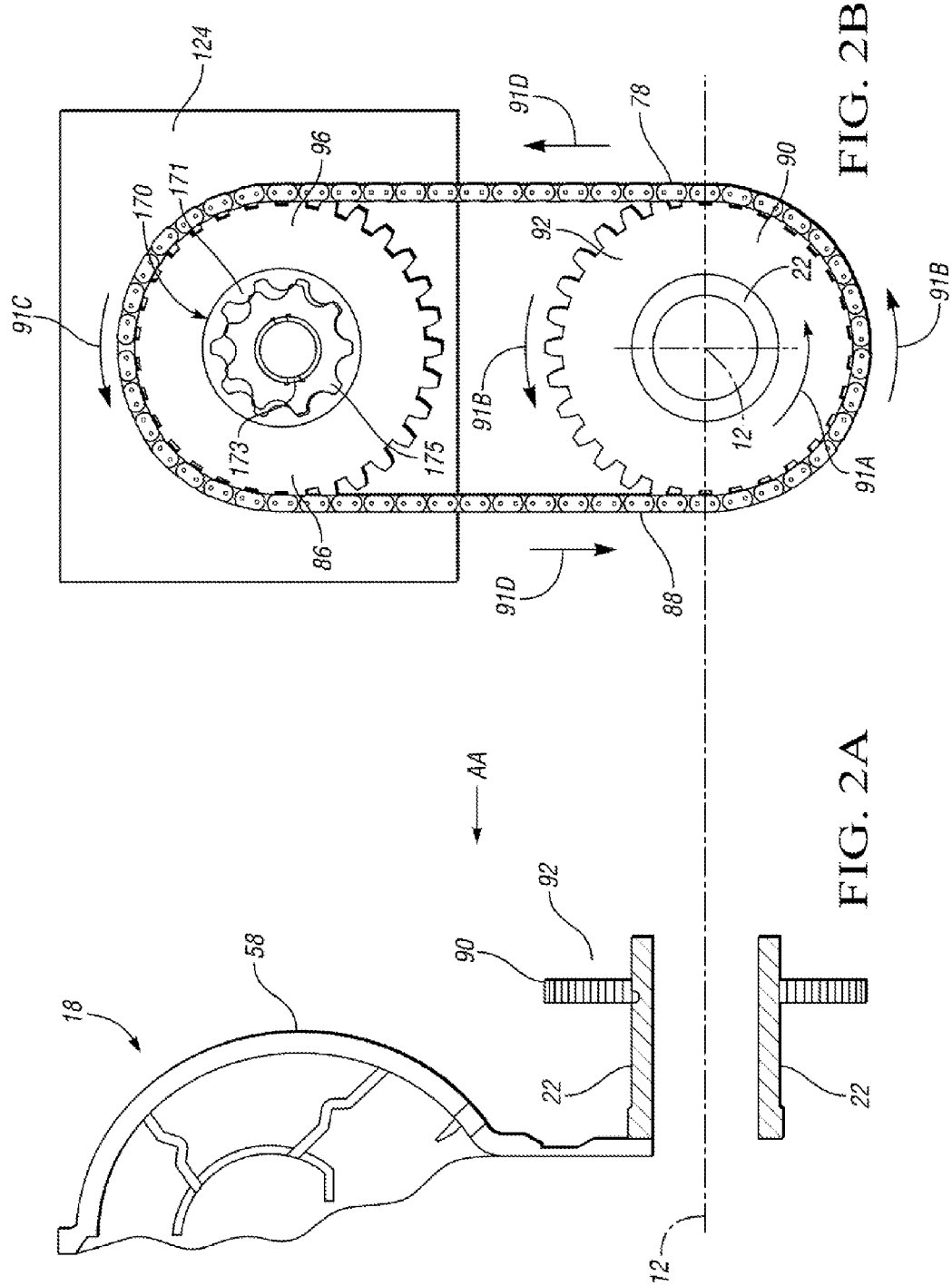

US 7,798,299 B2

DUAL INPUT CLUTCH TRANSMISSION WITH TORQUE CONVERTER PUMP DRIVE

TECHNICAL FIELD

The present invention relates to an apparatus and method for driving a transmission hydraulic pump within a vehicle having a dual input clutch transmission with a hydrodynamic torque converter.

BACKGROUND OF THE INVENTION

A hydrodynamic torque converter is a device used to amplify and transmit torque within step-type or single-input clutch automatic transmissions, replacing the conventional plate clutch or clutch pack often found in standard or manual transmissions. Conventional torque converters are contained within a separate housing that is bolted to the engine flexplate and positioned between the engine and the transmission, and therefore the torque converter housing turns or rotates at engine speed whenever the engine is running. A torque converter is comprised of a number of key structural members that cooperate to enable the engine crankshaft to continue rotating while the vehicle is stationary, for example while idling at a stop light or in heavy traffic. The key structural members include a turbine, i.e. the driven member of the torque converter, which is drivingly connected to the transmission gearbox, a stationary stator for redirecting the flow of fluid within the torque converter as the fluid exits the turbine, and a centrifugal pump and cover assembly, i.e. the driving member of the torque converter which is directly connected to the torque converter housing.

In contrast to a single-input clutch automatic transmission employing a hydrodynamic torque converter, a dual-input clutch transmission, also referred to as a DCT transmission, employs odd and even gears which are disposed on separate, coaxial rotatable input shafts. This divided gear arrangement allows each of two separate input clutches, typically wet or fluid lubricated friction clutch packs, to be dedicated to a respective subset of gears, thereby providing a smoother gear shifting event, which in turn may increase fuel efficiency while reducing shift shock. However, in spite of its enhanced shift performance capabilities, DCT transmissions generally require a greater amount of axial packaging space due to the greater relative size of the dual-input clutch than is required by a single-input clutch using a conventional torque converter.

SUMMARY OF THE INVENTION

Accordingly, an apparatus is provided for driving a transmission hydraulic pump within a vehicle having a dual input clutch transmission with a hydrodynamic torque converter, while also reducing axial packaging space within the transmission. The transmission includes a transmission pump having an internal fluid channel, wherein the dual-input clutch assembly is in fluid communication with the transmission pump through the fluid channel. The transmission also includes a torque converter having a torque converter pump and a rotatable hub which is directly connected to the torque converter pump and drivingly connected to the transmission pump.

In one aspect of the invention, the transmission pump and the torque converter are adjacently positioned along a common axis of rotation, and the pump is contained within a housing that at least partially supports the torque converter on one side and the dual-input clutch assembly on the other side.

In another aspect of the invention, the transmission pump is positioned between the torque converter assembly and dual-input clutch assembly along a common axis of rotation with the torque converter, the pump having a plurality of tangs which are drivingly connected to the hub through one or more mating hub slots.

In another aspect of the invention, the transmission pump is a fixed displacement pump having a gerotor gear set configured to further reduce axial packaging space.

In another aspect of the invention, the transmission pump is positioned along an axis different from that of the torque converter and is drivingly connected to the torque converter hub using a drive-chain and sprocket assembly.

In another aspect of the invention, a method is provided for reducing axial space within a dual-input clutch transmission having a torque converter and a transmission pump, the method locating the transmission pump directly behind the torque converter and mounting the dual-input clutch to the transmission pump for support of the dual-input clutch.

In another aspect of the invention, the method includes driving the transmission pump directly using a rotatable hub of the torque converter, wherein the transmission pump and the torque converter are positioned along a common axis of rotation.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2A is a schematic view of a portion of a dual-input clutch transmission having an off-axis hydrodynamic transmission pump according to a second embodiment of the invention; and FIG. 2B is a schematic view of an off-axis hydrodynamic transmission pump from the perspective of line AA of FIG. 2A.

DESCRIPTION OF THE PREFERRED EMBODIMENTS

Figure 1:
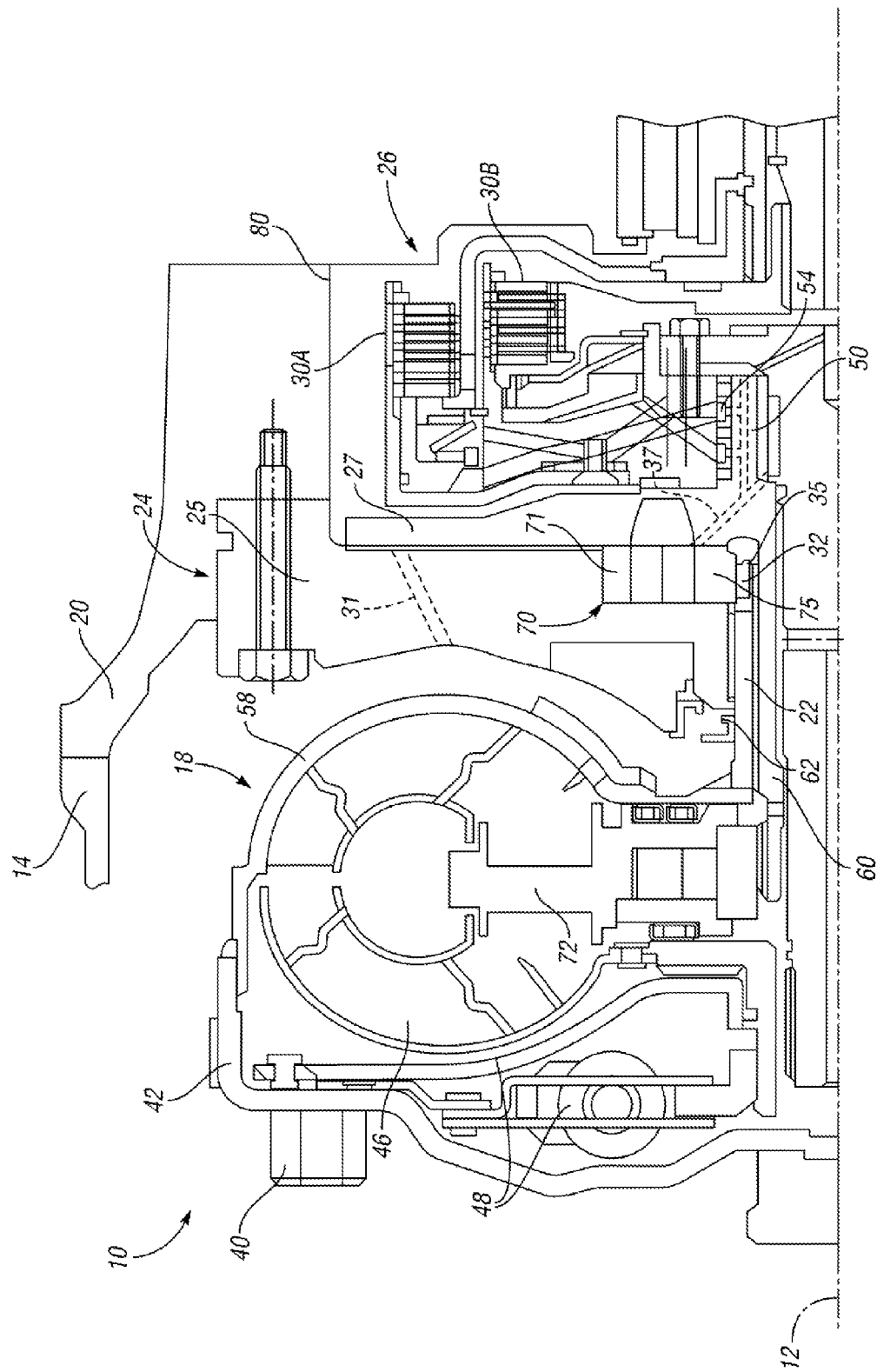
FIG. 1 is a cross-sectional view of a portion of a dual input clutch transmission having an on-axis transmission pump according to the invention.

Referring to the drawings wherein like reference numbers correspond to like or similar components throughout the several figures, there is shown in FIG. 1 a cross-sectional view of a portion of a dual-input clutch transmission or DCT transmission 10. For simplicity, only one axial portion of the DCT transmission 10 is shown relative to its primary centerline of rotation or axis 12. The DCT transmission 10 has a hydrodynamic torque converter assembly or torque converter 18 disposed within an outer bell housing 14. The bell housing 14 is cast, welded, or otherwise formed and is operatively attached to a similarly cast main transmission case 20. The DCT transmission 10 further includes a hydraulic transmission pump or on-axis pump 24 which at least partially circumscribes or wraps around the axis 12, with the term "on-axis" referring to the positional relationship of the on-axis pump 24 relative to the axis 12.

Mounted adjacent to or to the rear of on-axis pump 24 is a dual-input clutch assembly 26, which is disposed within a separate clutch housing 80. Clutch housing 80 is operatively attached to and supported by a substantially rigid structural support portion or back-hub extension 50 of the on-axis pump 24 to reduce the need for additional structural support members for the clutch housing 80. Dual-input clutch assembly 26 is comprised of a first and second input clutch 30A, 30B, respectively, both preferably wet-plate style friction clutch packs in direct fluid communication with the on-axis pump 24 through one or more internal fluid passages 54. The internal fluid passages 54 are preferably circular in cross-section in order to minimize fluid friction losses within the fluid passages as fluid (not shown) is delivered or conducted to the dual-input clutch assembly 26 for lubricating and cooling of the first and second clutches 30A, 30B.

Still referring to FIG. 1, torque converter 18 is comprised of a torque converter pump 58, turbine 46, stator 72, cover 42 with lug 40, and torque converter clutch assembly 48. The turbine 46 is operatively attached within the DCT transmission 10 to a transmission gear box (not shown), preferably driven only when the DCT transmission 10 is in gear. A rotatable torque converter hub 22 protrudes or extends axially outward from the torque converter pump 58 and has a slot 32 disposed thereon. Hub 22 is operatively attached to the torque converter pump 58 and to the cover 42, both of which are drivingly connected to the engine (not shown). Therefore, the torque converter pump 58 and cover 42 continuously receive torque from the engine while the engine is running and so are driven or rotated at engine speed.

On-axis pump 24 preferably at least partially circumscribes or wraps around and is centered on the rotatable hub 22 as previously described hereinabove, thereby minimizing the required amount of axial packaging space between the torque converter 18 and the dual-input clutch assembly 26 while also providing a rigid structure that the torque converter 18 and dual-input clutch assembly 26 may attach to for support, as shown in FIG. 1. On-axis pump 24 includes a pump body 25 containing a rotor set 70 having a drive member 75 and a driven member 71, and various valves (not shown) which are configured and arranged to control the operation of the on-axis pump 24, as well as a pump cover 27 for covering and protecting the various internal pump components. The pump body 25 and pump cover 27 may be constructed using any suitable combination of ferrous and/or non-ferrous materials, depending on the design requirements, for example to support the varying externally applied loads or forces in addition to the loads or forces generated internally within the on-axis pump 24.

The on-axis pump 24 and/or pump cover 27 preferably contain one or more internal fluid channels 31, 37, respectively, for efficiently conducting or directing oil or fluid through the on-axis pump 24 to the dual-input clutch assembly 26 while also minimizing the need for additional external fluid connectors. Additionally, configuring the on-axis pump 24 and/or pump cover 27 in this manner may facilitate a more rapid gear shifting process due to the more direct and shortened distances the fluid must travel from the torque converter 18 to the dual-input clutch assembly 26. The internal fluid channels 31, 37 may take the form of, for example, various die or sand-cast channels or passages formed within the cast-iron pump body 25 and/or cast-iron pump cover 27, or may be drilled and/or milled/machined therein. The internal fluid channels 31, 37 may optionally contain or connect to hydraulic valves (not shown) for regulating or limiting of pump pressure and/or fluid flow, and/or for regulating the fluid flow to the dual-input clutch assembly 26, torque converter 18, and/or torque converter clutch assembly 48, or other transmission components as needed.

The pump cover 27 is a substantially rigid, stationary member having a back hub extension 50 that provides further structural support for the dual-input clutch assembly 26, and is operatively attached to a stator shaft 60 operable for grounding of the stator 72, the attachment preferably accomplished using a serrated press fit and/or one or more lugs/bolts (not shown). Stator shaft 60 is preferably a hollow concentric shaft located radially inward of the hub 22. As stated previously hereinabove, hub 22 has one or more slots 32 which are operatively connected or attached to a mating tang or tangs 35 which are attached to or formed on the drive member 75 of the rotor set 70. In lieu of a tang/slot drive mechanism, "flats" may alternately be employed on both the hub 22 and on the drive member 75. Those skilled in the art will also recognize various other drive mechanisms that may be used in lieu of slots/tangs or flats for drivingly connecting the hub 22 with the rotor set 70 in the scope of the invention, for example mating gear teeth or other suitable drive mechanism.

In the interest of further reducing axial space requirements of DCT transmission 10, the on-axis pump 24 is preferably a fixed displacement pump utilizing a gerotor gear set, although various other pump styles and rotor sets 70 may be used within the scope of the invention. For example, involute gears or other gear forms or profiles, or vane pumps, whether fixed or variable displacement, and other common pump styles or designs may be configured for use within the scope of the invention. The rotatable pump body 25 and its internal rotor set 70 are preferably comprised of the same or like material, either ferrous or non-ferrous, so as to provide similar coefficients of thermal expansion between the body 25 and rotor set 70 and to thereby allow for tighter internal clearances, thus reducing internal fluid leakage.

Turning to FIG. 2A, a second embodiment is shown for use with an alternate packaging architecture, in which the on-axis pump 24 of FIG. 1 is replaced by an off-axis pump 124 mounted away from or off of the axis 12. The off-axis pump 124 is driveably connected to or driven by the rotatable torque converter hub 22, preferably by a first gear or sprocket 92 having a plurality of radially-projecting gear teeth 90 which are matable or engagable with the links 78 of a drive chain 88. As depicted in FIG. 2A, the off-axis pump 124 is positioned or spaced above or laterally away from the axis 12, although those skilled in the art will recognize that a variety of other positions or locations may be used as axially limited design and packaging requirements dictate.

Turning now to FIG. 2B, which is a schematic side view taken from the direction of arrow AA of FIG. 2A, rotatable torque converter hub 22 rotates in synchronization with the engine crankshaft (not shown), as previously described hereinabove. The rotation of hub 22, represented by arrow 91A, rotates or drives the first sprocket 92 to which it is operatively attached, the motion or rotation of which is represented by arrows 91B. Drive chain 88, which may also be a drive belt or other suitable drive mechanism, is operatively and driveably connected with a second sprocket 96, which is in turn operatively and driveably connected to the pump rotor set 170 of the off-axis pump 124, preferably to a pair of drive tangs 173 attached to or formed with a drive member 175 of the rotor set 170. Those skilled in the art will recognize the form of drive member 175 and driven member 171 of pump rotor set 170 will vary depending on the type and/or style of pump used, with drive member 175 and driven member 171 preferably comprising a gerotor gear set as shown in FIG. 2B. Therefore, as the torque converter hub 22 rotates at engine speed and drives or rotates first sprocket 92, the second sprocket 96 (arrows 91C) is driven or rotated by the motion of first sprocket 92 through drive chain 88, the motion of which is represented by arrows 91D. The rotational motion of second sprocket 96 powers or drives the drive-member 175 of the rotor set 170 of off-axis pump 124, thereby continuously powering the driven-member 171 of the off-axis pump 124 so that a reliable source of pressurized fluid (not shown) may be conducted throughout the transmission to be used as needed.

In this alternate embodiment, the off-axis pump 124 may be positioned at an axially compact distance from the torque converter 18 and dual-input clutch assembly 26 (see FIG. 1), but may therefore require additional external fluid connectors and/or passages (not shown) to deliver pressurized fluid (not shown) for controlling the operation of the off-axis pump 124. Also, a separate support arrangement may be required to support the dual-input clutch assembly 26 (see FIG. 1) in an axially compact configuration. While a chain-and-sprocket drive mechanism as described hereinabove is the preferred mechanism, those skilled in the art will recognize that other drive mechanisms may be suitable with the off-axis pump 124 within the scope of the present invention. For example, a separate pump shaft may be disposed within a hollow outer torque converter turbine shaft to conserve axial space.

While the best modes for carrying out the invention have been described in detail, those familiar with the art to which this invention relates will recognize various alternative designs and embodiments for practicing the invention within the scope of the appended claims.

The invention claimed is:

1. A dual input clutch transmission comprising:
   an on-axis transmission pump having a pump body, a pump cover connected to said pump body and having a back-hub extension, a first internal fluid channel formed within said pump body, and a second internal fluid channel formed within said pump cover;
   a dual-input clutch disposed within a clutch housing that is positioned immediately adjacent to said pump cover, said dual-input clutch supported by said back-hub extension, and having a first input clutch and a second input clutch, with said dual-input clutch sharing an axis of rotation with said on-axis transmission pump, and being in direct fluid communication with said on-axis transmission pump through at least one of said first and said second internal fluid channels and through internal fluid passages formed at least partially within said back-hub extension; and
   a torque converter having a torque converter pump and a rotatable hub which is operatively connected to said torque converter pump and drivingly connected to said on-axis transmission pump; wherein said torque converter and said on-axis transmission pump are adjacently positioned along a common axis of rotation and wherein said transmission pump is selected from a group of a gear pump and a vane pump.

2. The transmission of claim 1, wherein said pump body at least partially supports said torque converter, and wherein said pump cover supports said dual-input clutch via said back-hub extension.

3. The transmission of claim 1, wherein said rotatable hub is at least partially circumscribed by said pump to minimize the axial size of said transmission.

4. The transmission of claim 1, wherein said rotatable hub has at least one slot disposed at one end, and wherein said on-axis transmission pump includes a rotor set having a drive member, said drive member having at least one tang that is operatively connected to said at least one slot to transmit torque from said on-axis transmission pump to said rotor set when said rotatable hub is rotating.

5. The transmission of claim 4, wherein said on-axis transmission pump is a fixed displacement pump, and wherein said rotor set is a gerotor gear set.

6. A dual-input clutch transmission having a clutch housing enclosing a pair of input clutches of a dual-input clutch, and further having a torque converter and an on-axis transmission pump positioned directly behind the torque converter at an axially-compact distance from said torque converter and the dual-input clutch, wherein said torque converter is drivingly connected to said transmission pump for powering of said transmission pump, and wherein each of said pair of input clutches is supported by a back-hub extension of said transmission pump, and wherein said dual-input clutch is in direct fluid communication with the transmission pump through at least one of a plurality of internal fluid channels of the transmission pump and through internal fluid passages formed at least partially within said back-hub extension and wherein said transmission pump is selected from a group of a gear pump and a vane pump.

7. The transmission of claim 6, wherein said transmission pump and said torque converter are positioned along a common axis of rotation.

8. The transmission of claim 7, wherein said dual input clutch is substantially supported by said back-hub extension of said transmission pump.

9. A method of reducing axial space within a dual-input clutch transmission having two input clutches, a torque converter and an on-axis transmission pump sharing an axis of rotation with said input clutches, the transmission pump including a pump body and a pump cover having a back-hub extension supporting said input clutches, the method including:
   connecting said transmission pump to the torque converter at a position that is directly adjacent said torque converter;
   positioning the pump cover immediately adjacent to each of the pump body and a housing of said input clutches;
   mounting said housing to said pump cover and said input clutches; and
   directing fluid to said input clutches of the transmission through fluid channels formed within at least one of the pump body and the pump cover, and through internal fluid passages formed at least partially within said back-hub extension, thereby minimizing the distance of travel of the fluid between the torque converter and the input clutches;
   wherein said plurality of different fluid passages are configured for directing fluid from said transmission pump to said input clutches of said transmission and wherein said transmission pump is selected from a group of a gear pump and a vane pump.

10. The method of claim 9, wherein the torque converter and transmission pump are positioned along a common axis of rotation, the method further including driving said transmission pump directly using a rotatable hub of said torque converter.

11. The method of claim 9, wherein said on-axis transmission pump is a fixed displacement pump having a gerotor gear set.

* * * * *